(12) United States Patent
Cecil et al.

(10) Patent No.: US 6,742,714 B2
(45) Date of Patent: Jun. 1, 2004

(54) PROXIMITY CARD WITH INCORPORATED PIN CODE PROTECTION

(76) Inventors: Kenneth B. Cecil, 3184 Sage Glen, Escondido, CA (US) 92029; Charles A. Walton, 19115 Overlook Rd., Los Gatos, CA (US) 95030-4115

( * ) Notice: Subject to any disclaimer, the term of this patent is extended or adjusted under 35 U.S.C. 154(b) by 0 days.

(21) Appl. No.: 10/050,967

(22) Filed: Jan. 22, 2002

(65) Prior Publication Data

US 2002/0148895 A1 Oct. 17, 2002

Related U.S. Application Data (63) Continuation-in-part of application No. 09/397,269, filed on Sep. 16, 1999, now Pat. No. 6,340,116.

(51) Int. Cl.$^7$ ............................................... G06K 19/06
(52) U.S. Cl. ...................................... 235/492; 235/382
(58) Field of Search ................................ 235/492, 380, 235/382, 462.25, 462.46, 472.01, 472.02

(56) References Cited

U.S. PATENT DOCUMENTS

| | | | |
|---|---|---|---|
| 4,223,830 A | 9/1980 | Walton | |
| 4,236,068 A | 11/1980 | Walton | |
| 4,384,288 A | 5/1983 | Walton | |
| 4,459,474 A | 7/1984 | Walton | |
| 4,473,825 A | 9/1984 | Walton | |
| 4,614,861 A | 9/1986 | Pavlov et al. | |
| 4,658,529 A | * 4/1987 | Berolini | 42/70.08 |
| 4,800,255 A | * 1/1989 | Imran | 235/382 |
| 4,853,522 A | 8/1989 | Ogasawara | |
| 4,965,568 A | 10/1990 | Atalla et al. | |
| 5,016,376 A | * 5/1991 | Pugh | 42/70.11 |
| 5,397,884 A | * 3/1995 | Saliga | 235/382.5 |
| 5,465,519 A | * 11/1995 | Blanck | 42/70.11 |
| 5,559,507 A | 9/1996 | Beigel | |
| 5,561,706 A | 10/1996 | Fenner | |
| 5,627,355 A | 5/1997 | Rahman et al. | |
| 5,694,471 A | 12/1997 | Chen et al. | |
| 5,841,118 A | * 11/1998 | East et al. | 235/379 |
| 5,847,662 A | 12/1998 | Yokota et al. | |
| 5,874,896 A | 2/1999 | Lowe et al. | |
| 5,883,603 A | 3/1999 | Kim | |
| 5,949,680 A | * 9/1999 | Kettelkamp | 235/380 |
| 6,126,077 A | * 10/2000 | Tamaka et al. | 235/492 |
| 6,340,116 B1 | * 1/2002 | Cecil et al. | 235/492 |
| 6,374,356 B1 | * 4/2002 | Daigneault et al. | 235/382 |
| 6,449,892 B1 | * 9/2002 | Jenkins | 42/1.01 |

* cited by examiner

Primary Examiner—Daniel St.Cyr
(74) Attorney, Agent, or Firm—Hoffman, Wasson & Gitler, PC (57) ABSTRACT

An identification card, typically of the proximity type, having on its outer structure a numeric keyboard. When approaching a high security entrance, the user enters into the card a PIN code known only to himself or a few others. The PIN code entry is compared to a reference code within the card and if correct enables the logic system of the card. When the card is next placed in proximity to a reader antenna, a normal read occurs, that is the data of the card is transferred to the reader. The card acts as a data source. Identification data is transferred during the read action, and also financial transactions, and an emergency code if the user is under duress and requests emergency help. The data sent to the reader is also optionally sent to a higher order data processing system such as a central computer. In a second embodiment, the proximity circuits and antenna are made integral to a hand held palm top or lap top computer or cell phone. Thus, the computer or cell phone also serves as an identification device. The security system which reads the card is also able to transfer complex data to a central point. The PIN code entry expires after a brief time interval, so that each use of the card requires re-entry of the PIN code. The reader can be attached to a firearm, causing a safety latch to be released, based upon a signal generated by the identification card and received by the reader. Alternatively, the identification card can be directly inserted into the reader.

20 Claims, 7 Drawing Sheets

PROXIMITY CARD WITH INCORPORATED PIN CODE PROTECTION

This application is a continuation-in-part application of Ser. No. 09/397,269, filed Sep. 16, 1999 now U.S. Pat. No. 6,340,116.

FIELD OF THE INVENTION

The field of the invention is that of an electronic security systems, particularly those in which a user carries a credential device, usually in the form of a proximity card, bearing identification data.

BACKGROUND OF THE INVENTION

A shortcoming of prior art securing systems which use a card or similar device for identification of the bearer, is that the wrong person may gain control of the card. To guard against this risk, the proper bearer is assigned a personal identification number (PIN) code which must be included with the card for proper use. This number is typically known only to one or a very few people. The PIN code is analogous to the personal code used to operate an automatic teller machine. The PIN code is typically entered through a key pad mounted on or near the door frame.

Other inventions have introduced the concept of requiring a PIN code entry at the time of use. Some of these efforts require a keyboard mounted at the entry, thus spoiling the architecturally desirable feature of proximity systems, namely having no unwanted elements on the entry portal. These efforts are in part covered by patents listed in the second group, References 6 through 11 below. This group has the disadvantage of not being proximity and thus requiring mechanical reading equipment for accomplishing the intended use.

Reference #1, U.S. Pat. No. 4,236,068, has a keyboard on the card and has the convenience of proximity, but does not include the PIN feature. References 1 to 5 cover proximity but do not have the PIN code concept included. References 1 to 5 refer to multiple earlier patents on proximity systems, which are by now well established and known in the art. The References 1 to 5 provide ample proximity knowledge. References 6 through 11 provide patent background information on card and credential systems in which a PIN code is introduced.

REFERENCES AND PRIOR ART

The personal identification and signaling system of U.S. Pat. No. 4,223,830, shows a card with a button and various means for modulating and demodulating identifying data, and coupling this data to a reader and hence to a computer or communication system. This patent fails, however, to show entry of a PIN number to enable the card.

FIG. 1 of Reference Patent #1 U.S. Pat. No. 4,223,830 illustrates the card with an included antenna, battery, crystal and display.

| Number | Abbreviated Descriptive Title |
|---|---|
| Reference 1 | 4,223,830 | Indentification System with Dual Data Frequencies |
| Reference 2 | 4,236,068 | Personal Identification with Multiple Data Frequencies and Emergency Bits |
| Reference 3 | 4,384,288 | Pulse Position Modulation |
| Reference 4 | 4,459,474 | Direction, Differential |
| Reference 5 | 4,473,825 | Power I/O, Plus |

The group of patents covered by Reference 1 to Reference 5 show various methods of coupling data from the card, via antennas on both the card and the reader, to the reader, and hence to computer and communication systems. This is established art and provides several means for the subject invention to accomplish the identification data transfer through the proximity coupling function. These first five references list Charles Walton as the inventor.

| Number | Abbreviated Descriptive Title |
|---|---|
| Reference 6 | 5,559,507 | Signal Transmission and Tag Reading for Inductive Reader |
| Reference 7 | 5,883,603 | Implantable Biosensing Transponder |
| Reference 8 | 5,874,896 | Electronic Anti Shop Lifting System for RFID Tag |
| Reference 9 | 5,847,662 | Radio Card Communication Apparatus |

References 6 through 9 are other examples of proximity identification art by other inventors, but none have the added security of requiring entry of a PIN code before use, so that any unauthorized person gaining control of the card could achieve unauthorized entry.

| Number | Abbreviated Descriptive Title |
|---|---|
| Reference 10 | 4,614,861 | Unitary Self Contained Card Verification and Validation |
| Reference 11 | 4,853,522 | Access to Data Field with Multiple Services |
| Reference 12 | 4,965,568 | Multilevel Security with Personal Key |
| Reference 13 | 5,561,706 | Managing access with a Billing Code |
| Reference 14 | 5,627,355 | Transaction Device Protecting Account Numbers |
| Reference 15 | 5,694,471 | Counterfeit-Proof Identification Card |

The patents References 10 through 15 show means of introducing a PIN code into a hand held object such as a card, but fail to incorporate the proximity sensing feature. These patents do not solve the problem of both being easy to use, through proximity, and being secure.

SUMMARY OF THE INVENTION

The deficiencies of the prior art are overcome by the present invention which includes a proximity reader and card, using known proximity data coupling techniques. That is, the reader stimulates the card, causing the card to cycle through its data functions, and the data stored in the card is transferred to the reader. This invention adds to the card a keyboard, or data entry means, from which a sub group of digits can be entered into the card. When the PIN is entered into the card through the use of the keyboard, the PIN is compared to a previously stored internal reference PIN. If the two PINS agree, normal proximity data transfer is allowed to occur, and the bearer of the card is properly identified. If the internal reference PIN and the entered PIN do not agree, normal identification is denied. In other words, the bearer must have prior knowledge which establishes that he is the proper owner of the card. The system can also be mounted in a hand held or lap top computer and the computer keyboard used to enter the PIN. The system can also be mounted in a cell phone, and use the cell phone keyboard for entry of the PIN, and have the proximity loop antenna built into the phone.

In one embodiment of the present invention, the correct comparison between the entered PIN and the internal PIN would result in the transfer of information provided within the card to an external, proximity device close to, but not touching the card. This system would be used to allow the bearer of the card to be admitted to a particular area.

The system is secure because only the authorized bearer of the card is allowed admission to this area. More particularly, the method of card identification is known as proximity, meaning that the user need only hold the identification card near to a reader and identification is accomplished. The card need not be removed from a wallet or handbag to accomplish this identification function, provided the necessary personal identification number has been entered into the card. This invention is also in the category of security in which steps are taken to be certain that the proper person has control of the identification card, by requiring a PIN known only by the user to be entered into the card entry by the user.

Another embodiment of the present invention allows the proximity card to be used to activate electrical or mechanical devices. For example, the proximity card may be used to operate a firearm, only when the proper PIN is entered into the card. If this occurs, a signal would be sent to the firearm to release the safety.

Yet another embodiment of the present invention includes the use of the card being directly inserted into the slot of a card reader. After the PIN is entered by the bearer of the card, it would be inserted into the card reader. A comparison is made between the entered PIN and an internal PIN provided in the memory of the card. When inserted into the slot, a successful comparison of the two PINs would allow various operations to occur, such as the opening of a portal and/or the activation of various mechanical or electrical equipment.

DESCRIPTION OF THE PREFERRED EMBODIMENTS

Figure 1:
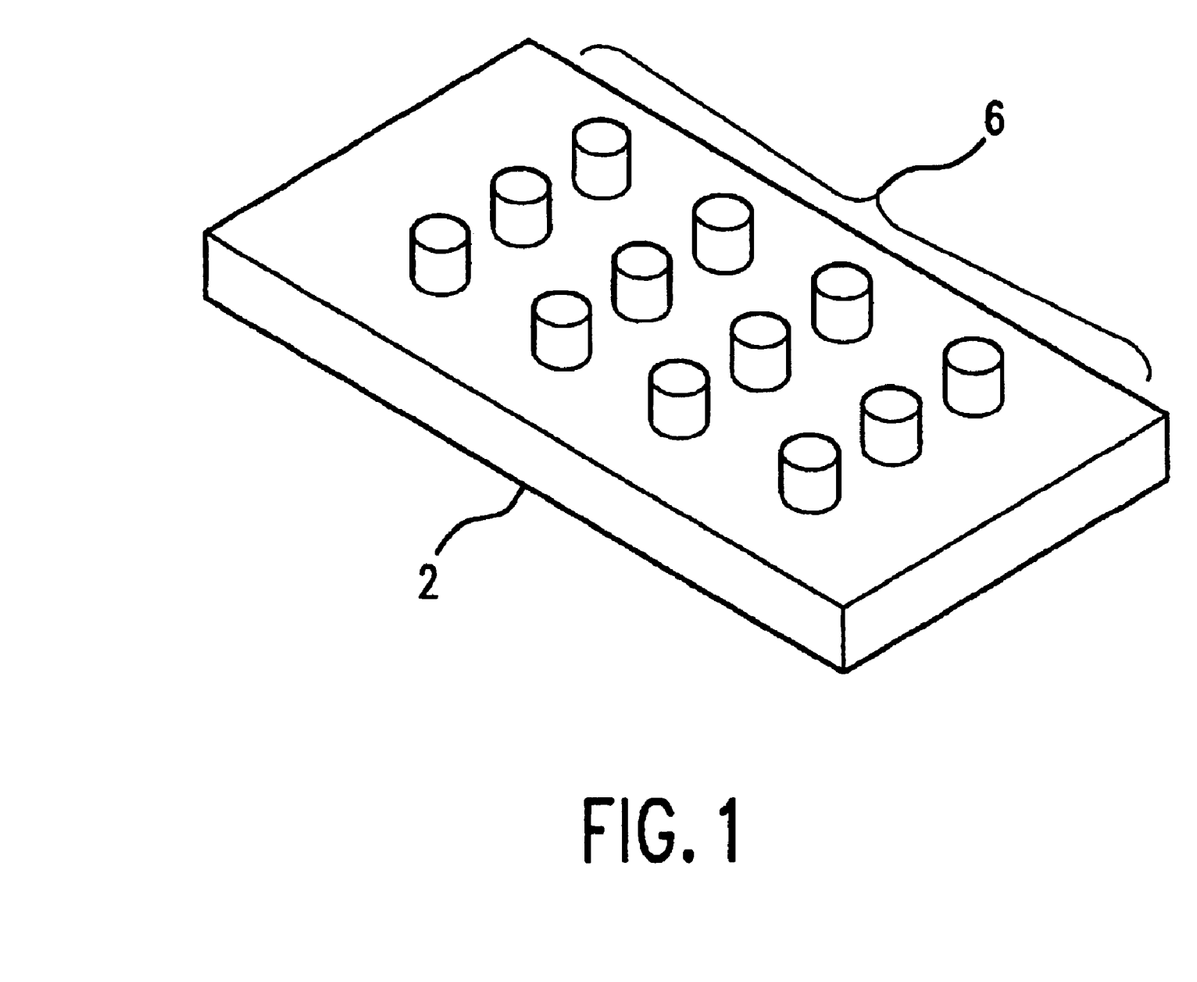
FIG. 1 shows the appearance of one form of the card, bearing the keyboard.

FIG. 1 illustrates an identification card used in the present invention. The typical size of this identification card 2, sometimes referred to as a "credential", will be that of a conventional credit card, such as 9 cm by 5.5 cm. This first preferred embodiment of the present invention is in the form of a card based on proximity technology. This technology allows the card to serve as a data source, or incorporate a data source, with the data communicated first to a reader and from the reader to any higher level processor, such as a central computer. The data to be transferred includes elements such as: an employee number, a unique personal identification number, an emergency number, and other stored data or keyboard data of any kind.

A keyboard 6 is provided on the surface of the card 2, typically bearing the ten numerals, representing the first ten numbers, plus two special symbols such as "star" and "pound". The keyboard is typically arranged in a conventional 3 by 4 manner, as on a telephone tone dial keyboard. The keyboard plan view is further pictured in FIG. 5 as element 92.

Within the card 2 are the other requirements for a proximity card, namely a loop antenna, a logic chip, and a source of power, for operating enable/disable/sequencing functions, to be discussed hereinabove. The source of power may be a small battery, or a solar cell. Alternatively, power can be supplied to the card 2 by a reader 60 as will be explained. If the reader 60 provides the power, the entry of the PIN code takes place in close proximity of the reader 60. If a battery or solar cell is used, the PIN code may be entered at any distance from the reader 60.

Figure 2:
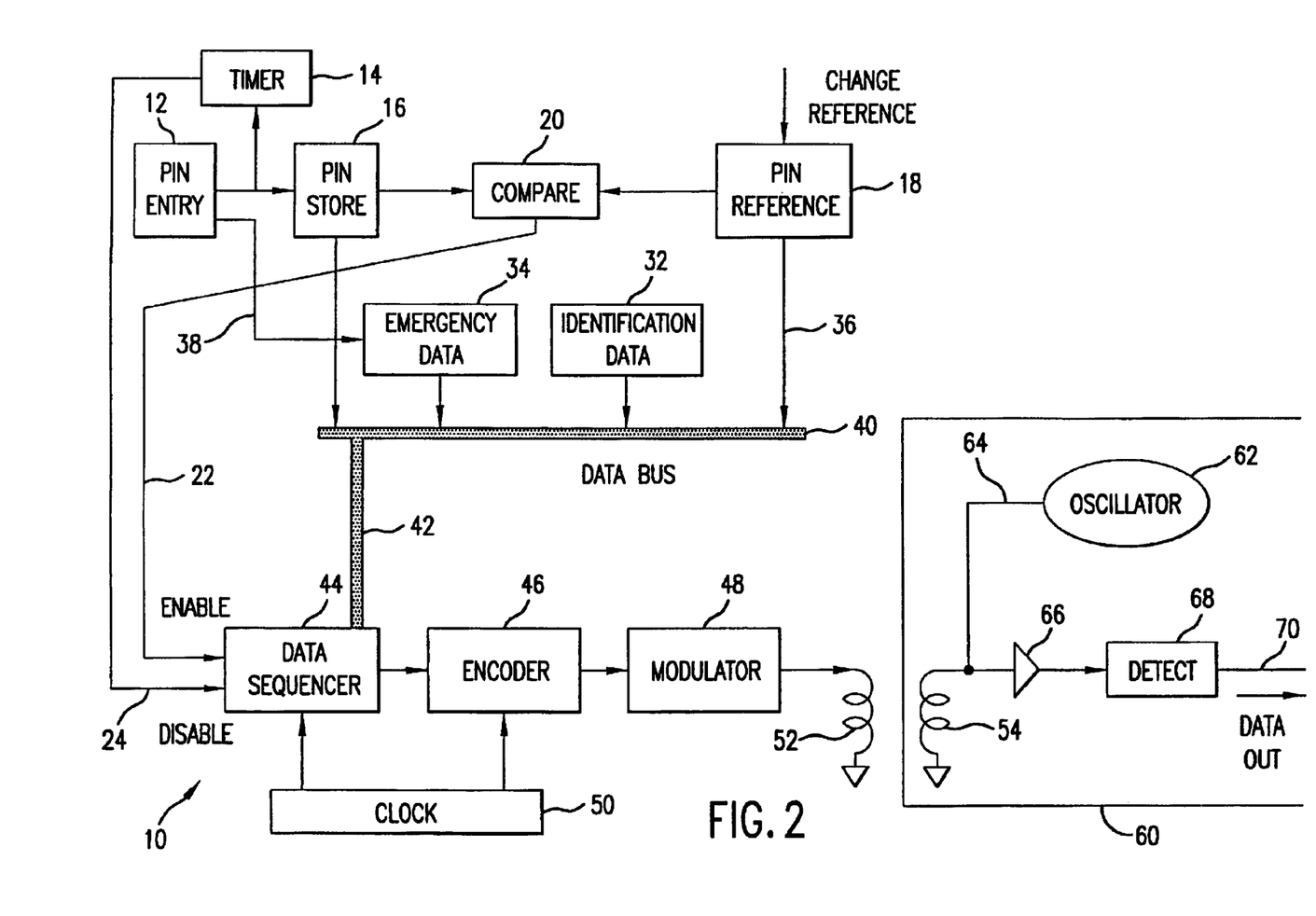
FIG. 2 shows the internal block diagram of the card.

FIG. 2 shows the internal logic 10 of the card 2, and a portion of the reader system 60. The user enters his PIN code in the keyboard 6, labeled as PIN entry 12 in FIG. 2. The PIN is known only to the user and to a limited number of personnel, such as the security department.

The entry action initiates a timing cycle in the timer 14, whose purpose will be described later. The data entry via PIN entry 12 is stored in PIN storage 16. Inside the card there is also a reference PIN number stored in storage 18. The reference PIN and user entered PIN are compared in comparator 20. If there is equality of the two values, a signal is emitted on the "enable" line 22 to a data sequencer 44. The function of the enable line 22 and data sequencer 44 will be described later.

There are several categories of data to be transferred from the card to the reader 60. One category is the identification of the card bearer. This ID is typically the employee badge number. The identification data may also contain financial data, especially if this card 2 is also what is known as a credit or a debit card. The identification data may also contain many other factors, such as health data, biometric data, and the authorization level of the user. This identification information is stored in a storage unit 32.

Also desirably transferred from the card 2 to the reader 60 is the PIN itself, from PIN storage element 16. This allows the central station to verify that entry is normal. Also desirably transmitted is the reference PIN data from storage 18, for additional verification of normal function.

A special form of information is that of emergency data. The card user may be under stress, such as illegally being held by a criminal at the point of a knife or a gun. Under these circumstances, the user enters a special code as well as the normal PIN code. Emergency data stored in 34 is reported to the central system via reader 60, by a path described later. Emergency data is sent from the PIN entry keyboard 12 to the emergency data 34 via line 38.

All the data sources 16, 34, 32 and 18 are connected to data bus 40. The bus 40 picks up each digital value from each source and delivers it via line 42 to a data sequencer device 44. The data sequencer 44 energizes one line at a time to each digit of each data source element. This technique is referred to as "serial data transfer" and is well known in the computer art and the security art and is also described in the reference patents, such as References 10 through 15.

The series of digits is next encoded for single line serial transmission, which requires insertion of clocking pulses from clock 50. The mix of clock pulses and data is accomplished with a clock encoder 46. The techniques of clock and data encoding are well known in the computer and data transmission art, and some versions are covered in patent References 1 through 6. A commonly used version is known as "Manchester Encoding". The result is a data stream of pulses of several widths and spacing.

This created logic stream drives a modulator 48. Methods of antenna modulation are known in the art and are covered in References 1 through 6. The modulation modulates the voltage on antenna coil 52.

Card antenna coil 52 is mutually coupled to an antenna 54 in the reader 60. The carrier frequency appears strongly in both coils. Fluctuations in the voltage of either appear as fluctuation in the other, through the fluctuations will be of differing amplitude. Fluctuations in the card antenna 52, produced by modulation, show up in the antenna loop 54, through the mutual coupling of loop antennas 52 and 54.

The PIN reference is stored in storage 18. The value may be stored during manufacture, or stored on first use by the user, or may be changed at will after use by different types of memory are known in the art. The mechanism for changing the reference PIN is not shown. It may be via the existing keyboard 6, or may be through external contacts on the card, or may be by electromagnetic insertion through a proximity coupling system.

Figure 3:
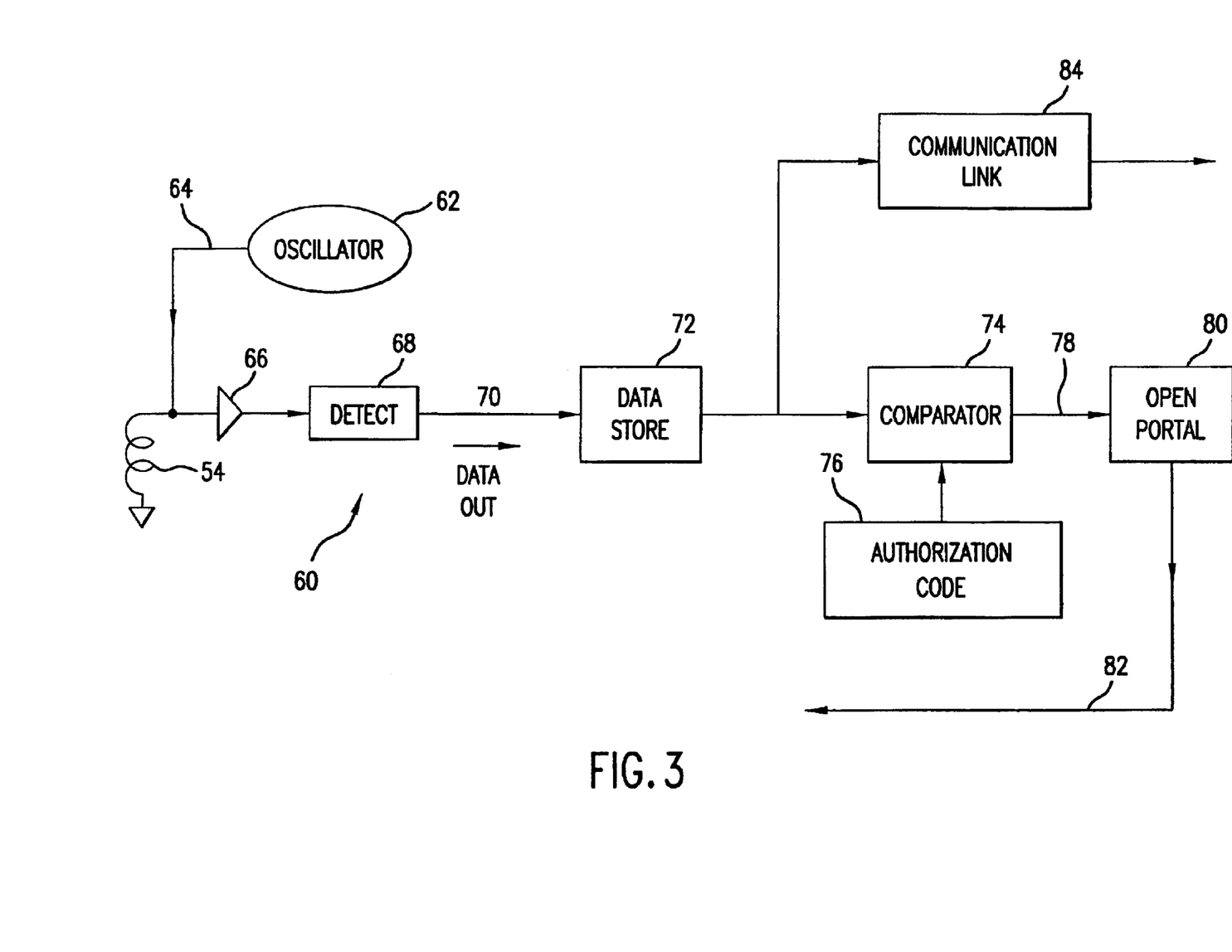
FIG. 3 shows a readers block diagram.

FIG. 3 illustrates the functioning of the basic reader 60. The reader 60 function is covered in References 1 through 6, and in other art, but the principle points are now repeated for purposes of completeness. Oscillator 62 excites the system, with its frequency referred to as the carrier frequency. The frequency value in many systems is between 110 and 130 kilohertz, and in another family of systems is 13.56 MHz.

The oscillator 62 drives line 64 to excite coil 54. Coil 54 is mutually coupled to the coil 52 in the card. The coil 52 is repeatedly loaded and unloaded, by the modulator 48, with the data intelligence, as described earlier. At the top of coil 54, which is the same as line 64, there is present both, the carrier frequency and the effects of modulation. The effects of modulation are fluctuations in amplitude. The voltage is amplified by amplifier 66. A detector 68 rectifies the voltage. The act of rectification, which uses diodes and capacitors, is called signal detection. Detection removes the carrier voltage but passes the fluctuations. These fluctuation represent the data from the card. The fluctuations are amplified to the logic pulse level within detector 68, and the clock pulses are removed, in the manner described in the references, leaving a basic string of data pulses on line 70. This data is stored in a data store 72.

In the basic form of the reader, the stored data in 72 is comprised in part of the employee badge number. The employee badge number is compared in comparator 74 with an employee badge number stored in storage 76, also referred to as an authorization code. If the employee badge number from the data source and the stored employee number match, an authorization signal is emitted on line 78 and sent to an open portal drive 80. Line 82 is energized to open a door, allowing admission of the employee. If the numbers do not match, an alarm is sounded indicating an unauthorized entry attempt.

In slightly more advanced systems, the data from the card 2 is first stored in the data storage unit 72, and then is sent through communication link 84 to a higher level computer system, not shown. This higher level computer system can make a variety of decisions, such as whether or not to ask for another reading, whether to operate an alarm, or check the time of request, and whether there is a user emergency.

Figure 5:
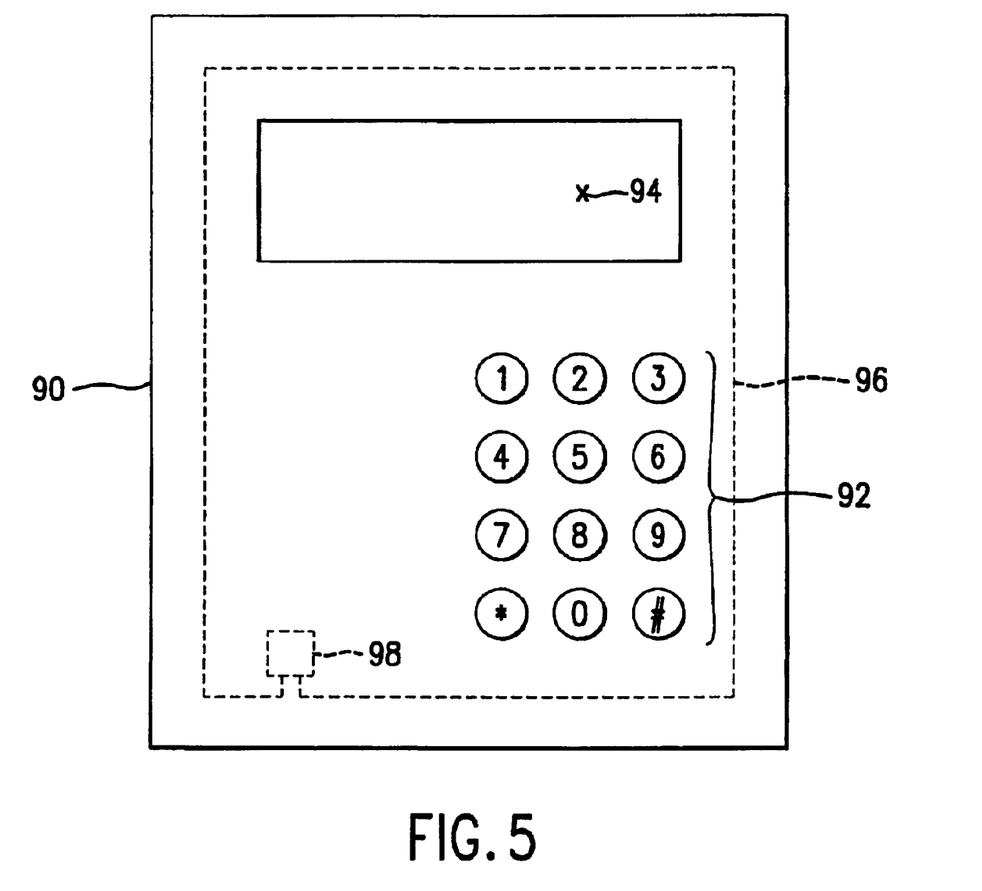
FIG. 5 shows a second view of a hand held computer incorporating PIN data transfer.

The communication link 84 is used when the palm top version, to be described in FIG. 5, sends more advanced information such as scheduling data, financial data, letters, memos, or other.

Figure 4:
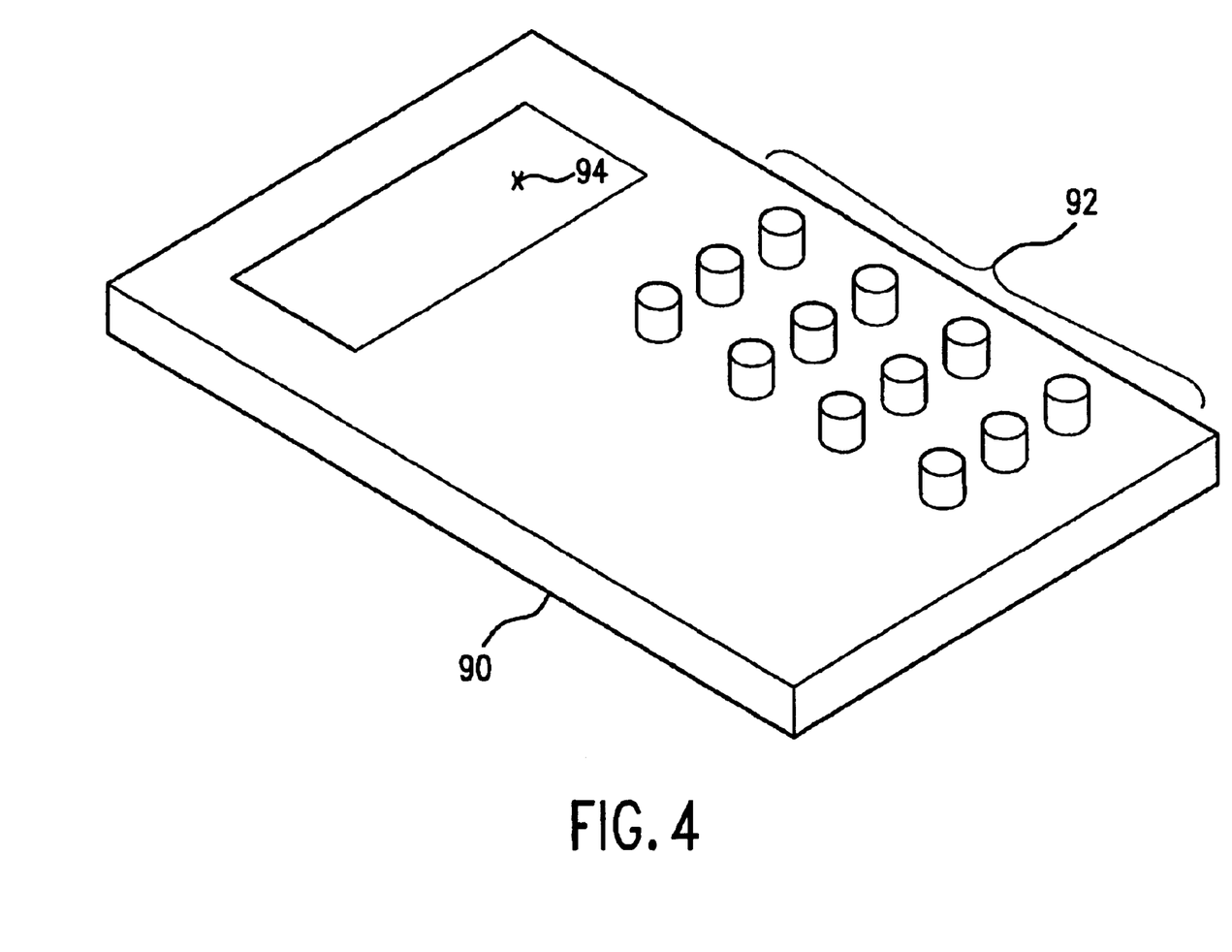
FIG. 4 shows a hand held computer incorporating PIN data transfer circuits.

FIGS. 4 and 5 display a second preferred embodiment, in the form of a hand held or lap top data processor 90, also referred to as computer 90. The hand held computer 90 is also referred to as a "palm toy" or "palm pilot" computer. Hand held "palm top" computers are useful for personal data storage and scheduling, and also for e-mail data processing and data processing in general. Computer 90 has a keyboard 92, a display window 94, and several internal chips. The computer 90 could also represent a cell phone, with its keyboard, and internal battery, and incorporated antenna, although usually minus the display panel.

The circuit elements of an identification and security system, of the dipole radiation type, are incorporated into the palm top computer, for an increase of function with little extra cost. Furthermore, the hand held computer becomes a source of data for the data elements described in the first embodiment, a proximity card, plus other data such as the results of sales calls or computations.

The hand held computer embodiment shown in FIG. 5 combines the technology of a palm top computer and the elements antenna 96 and chip 98 of a proximity identification system. The palm top 90 has the keyboard 92, as well as a conventional palm top screen 94. When the combination 90 is placed near the proximity security system, interacting the antenna 54 of reader 60 of FIG. 3, data is transferred from the computer 90 to the communication and computer elements of the security system.

In other words, FIG. 5 shows the addition to the palm top 90 of a sensing coil 96 and a chip 98. The chip 98 performs the modulation and data transmission functions of block 10 of FIG. 2. The PIN entry 12 of FIG. 2 is replaced by the keyboard 92 of FIG. 4. The keyboard 92 of the palm top portion of the combination 90 is suitable for entering and verifying the PIN code. The storage elements 16, 34, 32 and 18 may be designed into the chip 98, but for economy, the system would utilize the memory of palm top 90.

The battery which is standard in the hand held computer 90 allows powering of the logic from the battery, thus eliminating the logic power burden generally supplied by proximity coupling, and thus in turn allowing much greater range than for conventional proximity data transmission. That is, data coupling can occur through modulation of the voltage across the coil 54, yet the logic does not have to be powered by proximity coupling at the same time. Furthermore, the battery makes possible energization of the coil 96 on FIG. 5 or the coil 54 of FIG. 3 with a conventional radio frequency oscillator, and so achieve conventional radio transmission of a greater range. When this invention is utilized in a cell phone, it carries both a dipole antenna and an inductive loop proximity antenna.

Thus, the hand held palm top computer 90, or the cell phone version, serves as a proximity sensed security card 2, also referred to as a credential. It has the built in keyboard 92, equivalent to keyboard 6 in FIG. 1, and chip 98, which bears the logic functions shown in FIG. 2.

The user carries one less item. The system is secure owing to the PIN entrance requirement. Further, the user now has means for entering data into the central system utilizing security stations, which have previously been useful only for security purposes. The reader 90 has a dual function, that for security and data collection. A population of entry stations is available without the need to establish more stations.

One other precaution is taken against accidental use by the improper person. Referring to FIG. 2, after the PIN code is entered and stored in PIN store 16, the card is ready for viable entry. This viable status should not last indefinitely. The timer 14 is energized at the time of data entry and half selects (using the logic definition of half select) the data sequencer 44. The timer 14 will time out after a preset interval, typically one minute, and then prevent further use of the card until a fresh PIN entry function is performed.

The card 6 may also include a simple display, such as LCD or LED. In the palm top version, the screen is already available. The card 6 or combination 90 may contain a speaker for automatic dialing. It may be incorporated into, or be merged with, a variety of palm held devices now on the market.

The amount of time, after a successful PIN code entry, for which the system remains enabled will be determined by the application, such as whether there is simple successful opening of a portal, or whether heavy machinery has to be started, or the quantity of people to be admitted, or the weight and size of equipment to be moved through the portal.

Figure 6:
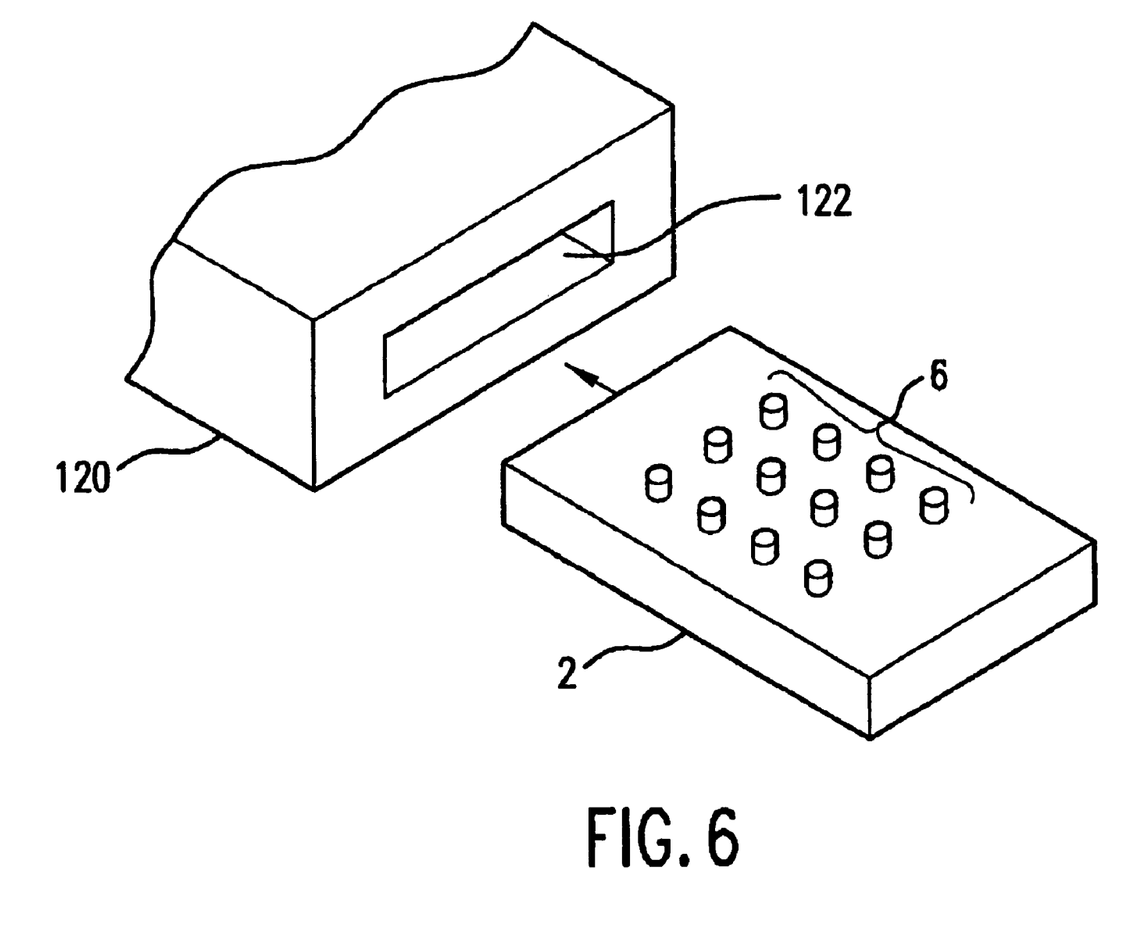
FIG. 6 shows the card being inserted into a card reader.

Yet another embodiment of the present invention is illustrated in FIG. 6. This embodiment employs the use of a reader 120 having a slot 122 for the insertion of the card 2 shown in FIG. 1. This card includes a keyboard 6. Similar to the embodiment shown in FIGS. 1–3, the user would input his PIN into the card employing the keyboard 6. Circuitry within the card would compare the entered PIN with a PIN stored therein. If a match is successful, when the card 2 is inserted into the slot 122, a device such as the portal 80 would be open. Information is transferred from the card 2 to the system of the present invention through the card reader 120, including a signal denoting a successful match employing contacts for magnetic bit sensors. Alternatively, a convention swipe-type reader may be employed in which a magnetic stripe (not shown) provided on the card would be read by one or more magnetic sensors within the slot of the swipe reader.

Figure 7:
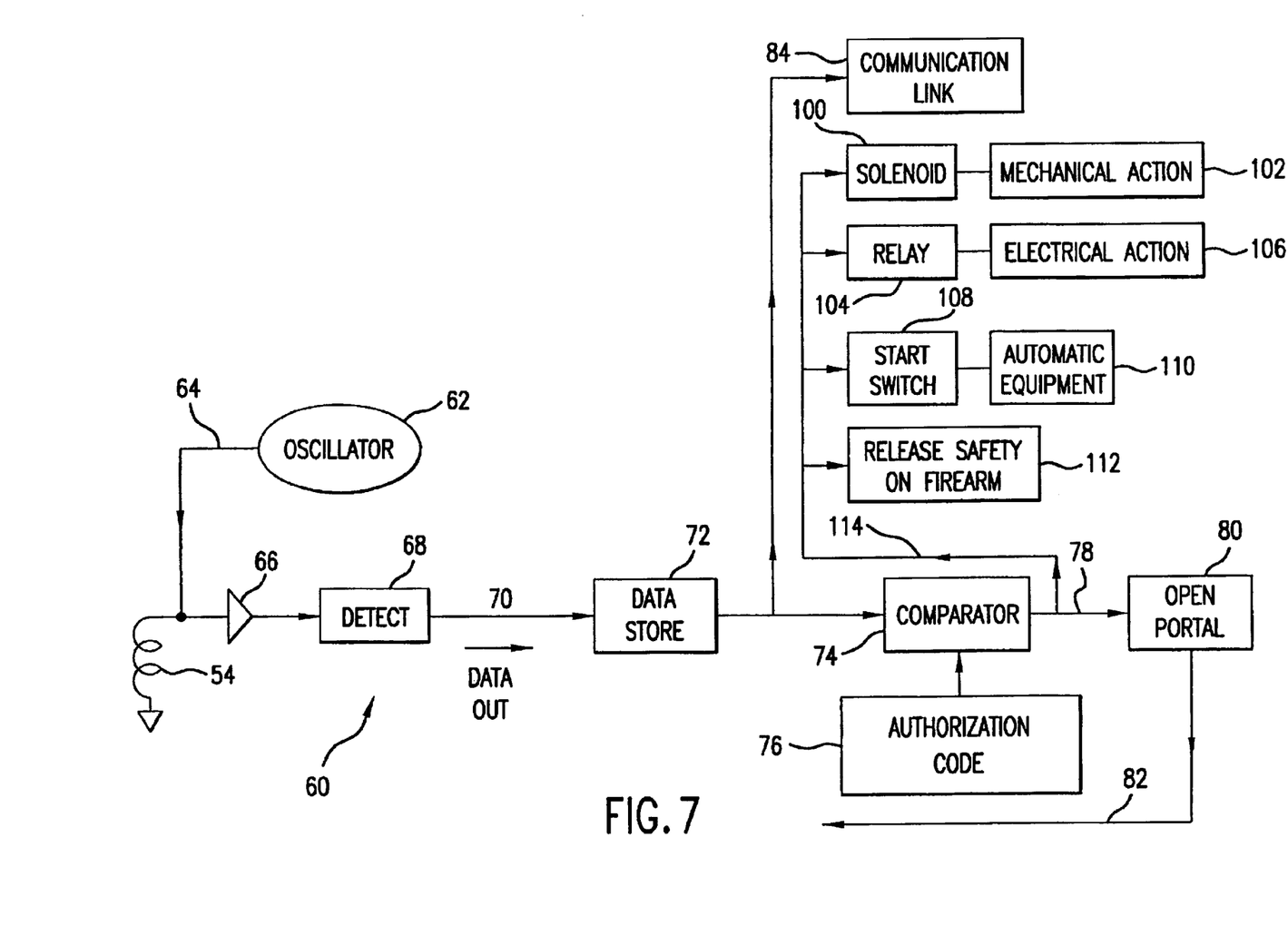
FIG. 7 shows a modification of the diagram shown in FIG. 3.

A successful match would also enable various other operations to be performed. For example, as shown in FIG. 7, a successful match would create a signal on line 114 which would operate a solenoid 100 or a relay 104. The solenoid 100 would cause a mechanical action to occur at 102 and the relay 104 would cause an electrical action to occur at 106. Additionally, the successful match would result in a switch 108 to activate a piece of equipment 110.

Another embodiment shows the use of the technology of the present invention to safely operate a firearm. Although this embodiment could be utilized with the card and card reader shown in FIG. 6, it would more likely be utilized with the proximity card shown in FIGS. 1–3, as well as the system illustrated in FIG. 7. In this embodiment, a firearm 112 would include the proximity sensor shown in FIG. 3. After the user has entered his PIN by the keyboard 6 and a successful match has been determined, a signal would be sent from the card 6 to the reader 60, thereby unlocking the safety latch on the firearm. Therefore, only the authorized bearer of the firearm, having knowledge of the PIN, would be capable of releasing the safety latch.

While the present invention has been described by means of several embodiments, the invention is not limited thereto, for obvious modifications will occur to those skilled in the art without departing from the spirit and scope of the invention.

What is claimed is:

1. An electronic identification system for operating a firearm provided with a safety latch, comprising:
   a portable proximity device provided with personal reference data information stored therein, said proximity device further including a device for manually entering personal data information therein;
   a receiver associated with the firearm;
   comparison means provided within said proximity device to compare said personal data information with said personal reference data information; and
   transmission device provided with said proximity device for transmitting a signal from said proximity device to said receiver only if said personal data information matches one of said personal reference data information, said signal releasing the safety latch of the firearm, thereby allowing said firearm to be utilized.

2. The electronic identification system in accordance with claim 1, wherein said portable proximity device and said receiver are each provided with an antenna for receiving and transmitting information.

3. The electronic identification system in accordance with claim 2, wherein said signal is transmitted from said portable proximity device to said receiver by radio frequency waves.

4. The electronic identification system in accordance with claim 3, wherein said antennas are dipole antennas.

5. The electronic identification system as in claim 2 in which the said device for entering personal identification numbers is a data entry device integral to the said data source.

6. The electronic identification system as in claim 1 in which the said means for entering said personal data information is a data entry device integral to said data source.

7. The electronic identification system as in claim 1, powered by battery.

8. The electronic identification system as in claim 1, powered by solar cell.

9. The electronic identification system as in claim 1, powered through the antenna by electromagnetic coupling and rectification and thence to the circuits of said data source.

10. The electronic identification system in accordance with claim 1, further including a timer initiated by the entry of said personal data information, after a suitable period of time, said timer emitting a command which halts the functioning of said portable proximity device until there is a second entry of said personal data information into said proximity device.

11. The electronic identification system in accordance with claim 10, wherein said suitable period of time is adjustable by the user.

12. An electronic identification system, comprising:
   a portable device provided with a memory including stored data information, an input device for manually entering personal data information into said portable device, and a comparison device for comparing said stored data with said personal data information, and producing a first output signal only if said personal data information entered in said input device matches a number in said stored data information; and
   a receiver for receiving said first output signal produced by said portable device, said receiver in physical contact with said portable device when receiving said first output signal, said receiver producing a second output signal to operate a device.

13. The electronic identification system in accordance with claim 12, wherein said input device is a keyboard or keypad.

14. The electronic identification device in accordance with claim 12, further including a timer provided in said portable device initiated by the entry of said first data information, after a suitable period of time, said timer emitting a command which halts the functioning of said portable device until there is a second entry of the first data information into said portable device.

15. The electronic identification system in accordance with claim 12, wherein said second output signal opens a portal to allow access to a protected area.

16. The electronic identification system in accordance with claim 12, wherein said second output signal operates a solenoid.

17. The electronic identification system in accordance with claim 12, wherein said second output signal operates a relay.

18. The electronic identification system in accordance with claim 12, wherein said second output signal operates a switch.

19. The electronic identification system in accordance with claim 12, wherein said portable device has a magnetic strip thereon and said receiver is provided with a magnetic swipe reader.

20. The electronic identification system in accordance with claim 14, wherein said suitable period of time is adjustable by the user.

* * * * *